C. Barnes,
Vise.
Nº 76,584. Patented Apr. 14, 1868.
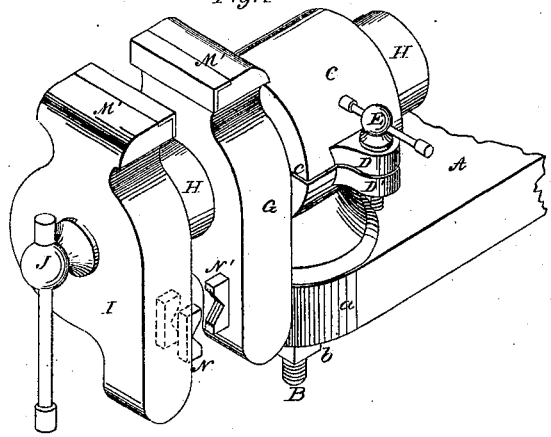
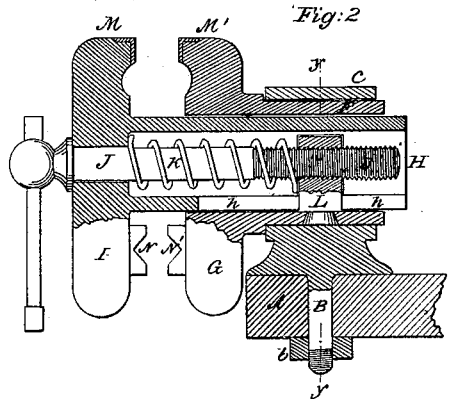
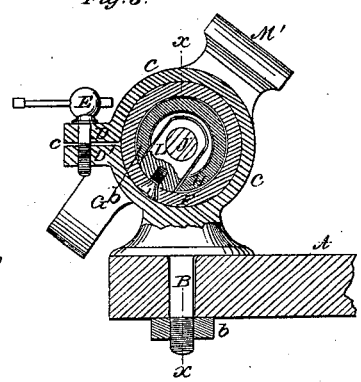
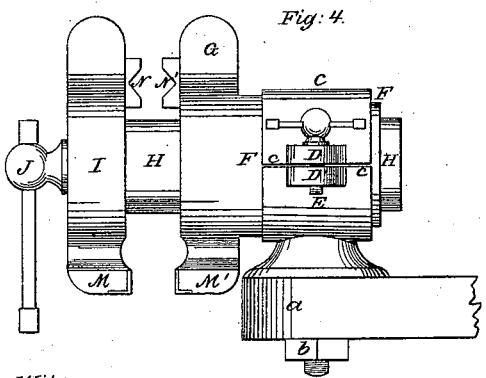
Witnesses:
James H. Layman.
Chas Bauer
Inventor:
Charles Barnes.
By Knight Bros
Attys.

United States Patent Office.

CHARLES BARNES, OF CINCINNATI, OHIO.

*Letters Patent No. 76,584, dated April 14, 1868.*

IMPROVEMENT IN VISES.

*The Schedule referred to in these Letters Patent and making part of the same.*

TO WHOM IT MAY CONCERN:

Be it known that I, CHARLES BARNES, of Cincinnati, Hamilton county, and State of Ohio, have invented a certain new and useful Vise; and do hereby declare the following to be a full, clear, and exact description thereof, reference being had to the accompanying drawings, making part of this specification.

This invention relates to a construction of bench-vise, which, in its most complete form, is adapted to hold a great variety of objects in any desired position, and comprises a pair of jaws adjustable toward and from one another in a horizontal plane, and also capable of angular or rotary adjustment about a vertical as well as around a horizontal axis.

Figure 1 is a perspective view of a bench-vise embodying my invention.
Figure 2 is an axial section of the same in the line $x\,x$.
Figure 3 is an axial section in the line $y\,y$.
Figure 4 is a side elevation thereof.

A represents a portion of a bench, having a rounded edge, $a$, to permit of any desired horizontal vibration of the vise, and being traversed vertically by the shank B, secured by nut $b$, of a cylindrical yoke, C, which is parted, $c$, on one side, and provided with ears, D D', traversed by a screw-bolt, E, whose screw-threaded portion is tapped into the lower ear, D', so as to enable the lips of the parting to be closed toward each other, and to thus firmly gripe the tubular stem F of the rear cheek G.

Fitted snugly within the cylindrical interior of the stem F is the stem H of the front cheek I, which stem is likewise tubular, to receive the main screw J and spiral spring K. The stem H is slotted, $h$, to permit the traverse of a nut, L, which is attached to and projects within the stem F, and into which the main screw, J, is tapped. The slot $h$ and nut L co-act to hold the jaws in accurate opposition, and likewise admit of their approach and separation.

M M are the customary jaws, and, from these, the cheeks are prolonged beyond the stems, and are armed with V-formed or angular jaws N N' for griping pipes and other round objects.

It will be seen that the two cheeks of this vise are susceptible of being vibrated bodily through about ninety degrees, or more, in a horizontal plane about the shank B, and are susceptible of complete vertical rotation about the shank F.

This arrangement enables the resting of one end of a pipe, of any length, in any convenient position upon the ground, while the other end is firmly and conveniently held in the vise, and it also enables the work to be presented in various convenient positions without being removed from the vise, and the nut $b$ and screws E and J enable the cheeks to be securely held to any position of adjustment whatsoever.

The spiral spring K serves to hold the cheeks to any position of separation permitted by the main screw.

I do not propose to restrict the invention to the precise form here shown, the same being susceptible of various modifications; for example, the stem F and yoke E may be spherical, instead of cylindrical, at their place of contact, the yoke being parted on both sides, and secured by two bolts.

I claim herein as new, and of my invention—

1. A bench-vise, adjustable around two centres, at right angles to each other, substantially as set forth.
2. The arrangement of cheeks G and I, with tubular stems F and H, capable of being slid one within the other, and secured within the divided yoke C, vibrating about a vertical stem, B, in combination with the nut $b$ and screws E and J for regulating and fixing the adjustments.

In testimony of which invention, I hereunto set my hand.

CHARLES BARNES.

Witnesses:
  GEO. H. KNIGHT,
  JAMES H. LAYMAN.